(12) United States Patent
Nagaya et al.

(10) Patent No.: US 11,518,438 B2
(45) Date of Patent: Dec. 6, 2022

(54) VEHICLE FRAME STRUCTURE

(71) Applicant: Toyota Jidosha Kabushiki Kaisha, Toyota (JP)

(72) Inventors: Satoru Nagaya, Toyota (JP); Yoshimi Toda, Toyota (JP); Yozo Ikeda, Toyota (JP); Shingo Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 16/910,929

(22) Filed: Jun. 24, 2020

(65) Prior Publication Data

US 2020/0406975 A1    Dec. 31, 2020

(30) Foreign Application Priority Data

Jun. 28, 2019  (JP) .............................. JP2019-121188

(51) Int. Cl.
| | | |
|---|---|---|
| *B62D 21/03* | (2006.01) | |
| *B62D 27/06* | (2006.01) | |
| *B60K 1/00* | (2006.01) | |
| *B62D 21/00* | (2006.01) | |
| *B62D 27/02* | (2006.01) | |
| *B62D 31/02* | (2006.01) | |
| *B60K 1/04* | (2019.01) | |

(52) U.S. Cl.
CPC ................ *B62D 21/03* (2013.01); *B60K 1/00* (2013.01); *B62D 27/06* (2013.01); *B60K 2001/0438* (2013.01); *B60Y 2306/01* (2013.01); *B62D 21/00* (2013.01); *B62D 27/02* (2013.01); *B62D 31/02* (2013.01)

(58) Field of Classification Search
CPC ........ B62D 21/03; B62D 27/06; B62D 27/02; B62D 31/02; B62D 21/00; B60K 1/00; B60K 2001/0438; B60Y 2306/01
USPC ........................................................ 180/312
See application file for complete search history.

(56) References Cited

U.S. PATENT DOCUMENTS

| | | | |
|---|---|---|---|
| 2012/0097466 A1* | 4/2012 | Usami ..................... | B60K 1/04 180/68.5 |
| 2014/0311812 A1* | 10/2014 | Kambayashi ........ | B62D 25/082 180/65.1 |
| 2015/0246606 A1 | 9/2015 | Katayama et al. | |

FOREIGN PATENT DOCUMENTS

| | | |
|---|---|---|
| JP | 2004-314803 A | 11/2004 |
| JP | 2011-116250 A | 6/2011 |
| JP | 2014-015166 A | 1/2014 |
| WO | 2014/069046 A1 | 5/2014 |

* cited by examiner

*Primary Examiner* — D Glenn Dayoan
*Assistant Examiner* — Dana D Ivey
(74) *Attorney, Agent, or Firm* — Dinsmore & Shohl LLP (57) ABSTRACT

A vehicle frame structure includes a pair of rear side members extending along a length of a vehicle in a lower part of the vehicle, and a first cross member coupling the pair of rear side members. The first cross member includes an intermediate member and a pair of coupling members. The intermediate member extends along a width of the vehicle at a location further downward with respect to the rear side members and is located under a motor unit. The pair of coupling members respectively extend downward or diagonally downward from the respective side members toward the opposite ends of the intermediate member.

10 Claims, 8 Drawing Sheets

VEHICLE FRAME STRUCTURE

CROSS REFERENCE TO RELATED APPLICATION

This application claims priority to Japanese Patent Application No. 2019-121188 filed on Jun. 28, 2019, which is incorporated herein by reference in its entirety including the specification, claims, drawings, and abstract.

TECHNICAL FIELD

The present disclosure relates to a vehicle frame structure disposed in a lower part of a vehicle.

BACKGROUND

Electric drive vehicles including a motor as a power source have been widely known. These electric drive vehicles include, within a power unit chamber, a motor unit that houses as a unit, a motor and a gear that decelerates the motor output, for example. The power unit chamber is typically located in a lower frontward portion or lower rearward portion in a vehicle. To secure space in the vehicle interior, there has been a demand to reduce the size of the power unit chamber by minimizing empty space therein.

In a known technique, the power unit chamber includes a pair of side members extending along the length of a vehicle and a cross member coupling the pair of side members, and the cross member is disposed under the motor unit.

JP 2011-116250 A, for example, discloses a structure in which a motor unit is supported with two cross members arranged along the length of a vehicle. In JP 2011-116250 A, right and left ends of a rearward cross member are curved upward so that an intermediate portion of the rearward cross member in the vehicle width direction is located below the side members and the motor unit. This structure can secure a spacious volume above the intermediate portion of the rearward cross member, thereby lowering the installation level at which the motor unit is disposed above the intermediate portion.

In JP 2011-116250 A, a portion of the cross member that extends along the width of the vehicle below the side members (which will be referred to as an "intermediate portion") and a portion of the cross member that couples this intermediate portion to the side member (which will be referred to as a "coupling portion") are formed of a single continuous member. With this configuration, it is necessary to form a comparatively large curved portion in a region of the cross member where the intermediate portion transitions to the coupling portion. This commonly leads to creation of dead space due to the difficulty in locating components above or below this curved portion. As such, when the intermediate portion and the coupling portions of the cross member are formed of a single continuous member as in JP 2011-116250 A, the dead space in the power unit chamber cannot be reduced sufficiently.

An embodiment of the disclosure is therefore directed toward a vehicle frame structure in which dead space in a power unit chamber is further reduced.

SUMMARY

In accordance with an aspect of the disclosure, a vehicle frame structure includes a pair of side members extending along a length of a vehicle in a lower part of the vehicle, and a first cross member coupling the pair of side members. In the vehicle frame structure, the first cross member includes an intermediate member extending along a width of the vehicle at a location further downward with respect to the side members and located under a motor unit. The first cross member further includes a pair of coupling members respectively connected to opposite ends of the intermediate member along the width of the vehicle. The coupling members respectively extend downward or diagonally downward from the respective side members toward the opposite ends of the intermediate member.

As the first cross member is composed of the intermediate member and the pair of coupling members respectively connected to opposite ends of the intermediate member in the vehicle width direction, it is not necessary to form large curved portions at the opposite ends of the first cross member in the vehicle width direction. The absence of such curved portions leads to a reduction in the dead space in a power unit chamber.

In the above configuration, the coupling members may be respectively removably fastened to the opposite ends of the intermediate member with fastening members.

This configuration allows the motor unit to be easily removed from the vehicle by removing the intermediate member from the coupling members while accessing the intermediate member from under the vehicle, and thus increases maintainability of the motor unit.

The vehicle frame structure may further include a second cross member coupling the pair of side members at a location further outward along the length of the vehicle with respect to the first cross member. The second cross member may include an intermediate portion along the width of the vehicle, which faces the motor unit along the length of the vehicle.

This configuration allows the second cross member to receive a collision load before the motor unit receives the collision load at the time of vehicle collision, to thereby reduce a collision load to be input to the motor unit and reliably protect the motor unit.

The vehicle frame structure may further include a torque rod extending from a lower part of the motor unit outward along the length of the vehicle and fastened to a bottom face of the second cross member.

Such a torque rod may be disposed to reduce oscillation of the motor unit. The torque rod, which is fastened to the bottom face of the second cross member, can also be easily removed from the vehicle by accessing the torque rod from underside of the vehicle.

The intermediate member may have a linear shape extending straight along the width of the vehicle.

The simplified shape of the intermediate member described above can reduce a dead space and also reduce the manufacturing cost of the intermediate member.

The vehicle frame structure according to the disclosure may reduce the dead space in the power unit chamber.

BRIEF DESCRIPTION OF DRAWINGS

Embodiment of the present disclosure will be described based on the following figures, wherein.

DESCRIPTION OF EMBODIMENTS

The configuration of a vehicle 10 will be described with reference to the drawings. In each drawing, symbols "Fr", "Up", "L" respectively denote vehicle frontward, vehicle upward, and leftward in the vehicle width direction.

Figure 1:
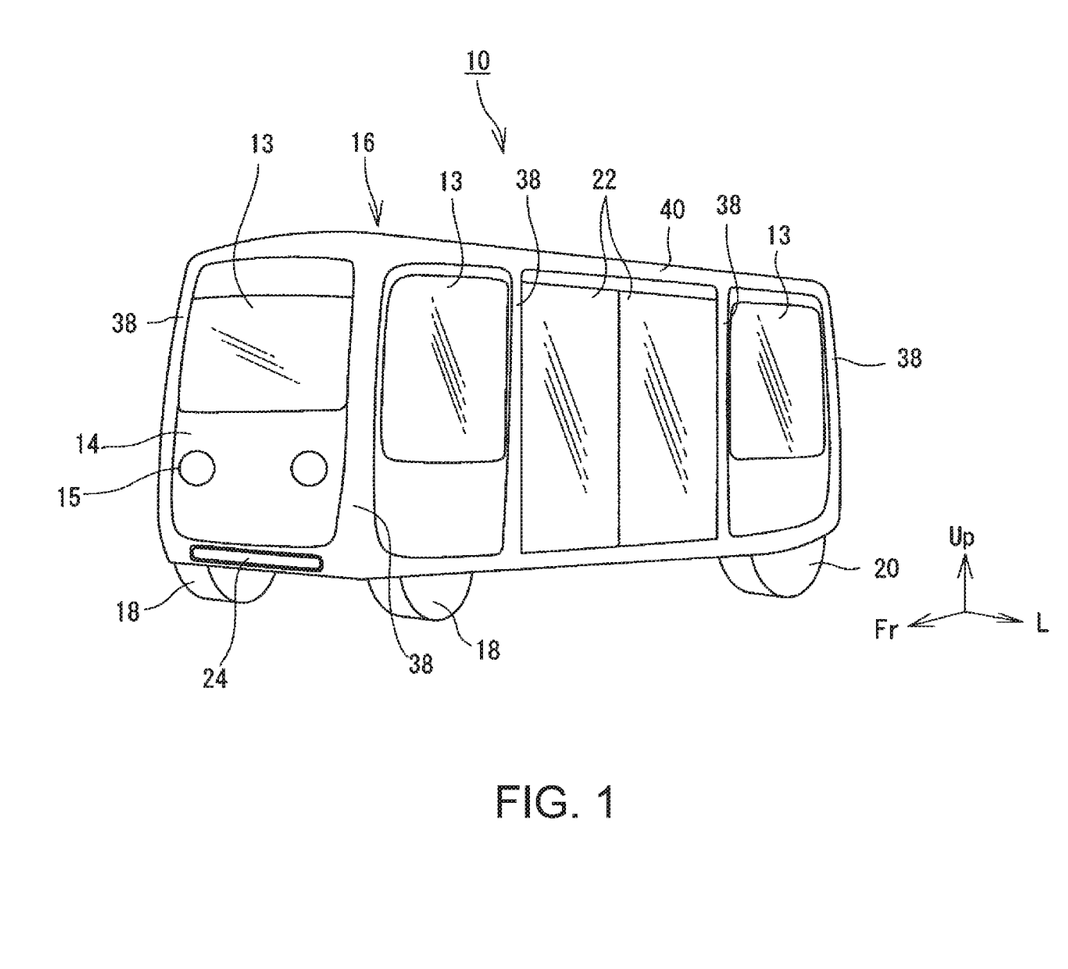
FIG. 1 is a perspective view of a vehicle viewed from outside.
Figure 2:
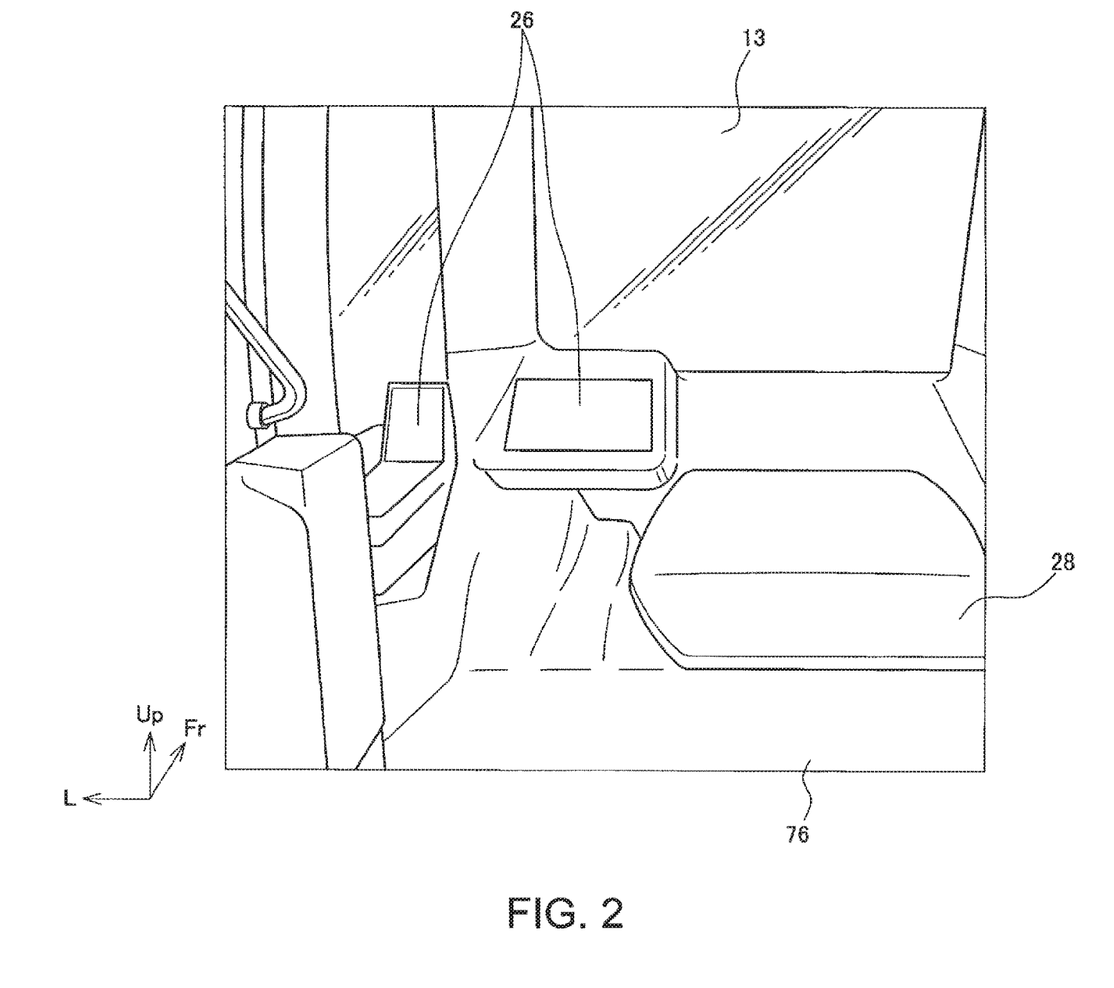
FIG. 2 is a perspective view of a vehicle interior viewed from the vehicle center toward the vehicle front.
Figure 3:
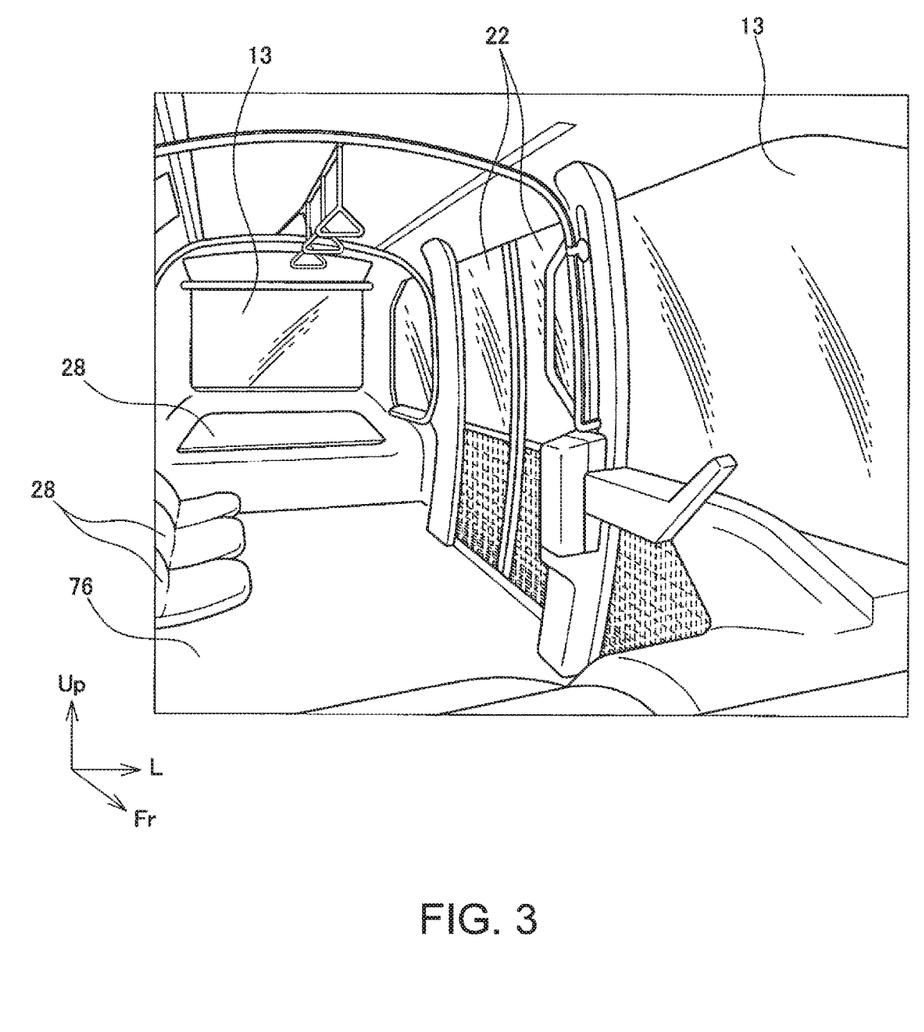
FIG. 3 is a perspective view of the vehicle interior viewed from the vehicle front toward the vehicle rear.
Figure 4:
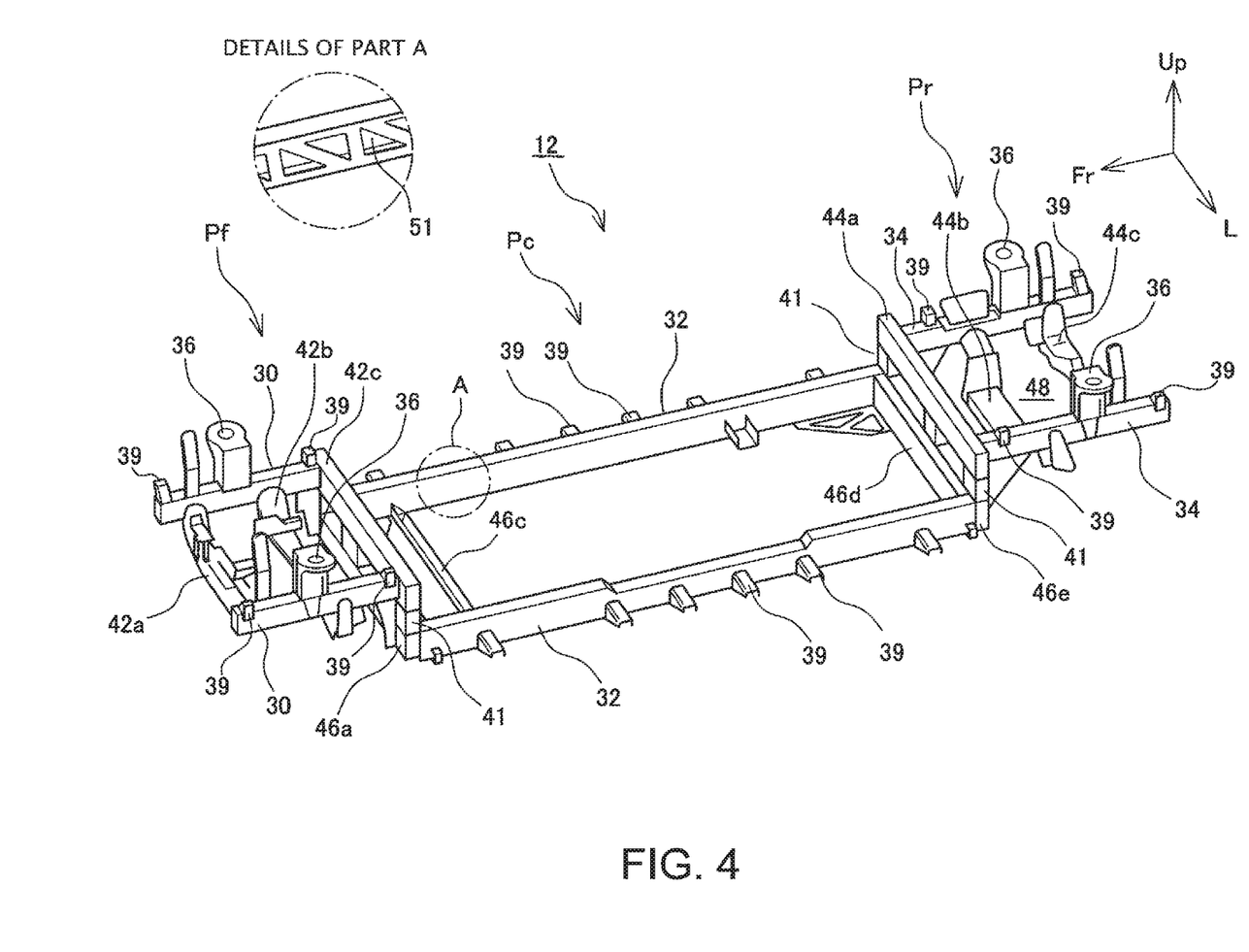
FIG. 4 is a perspective view of a main frame of the vehicle viewed from a side thereof.
Figure 5:
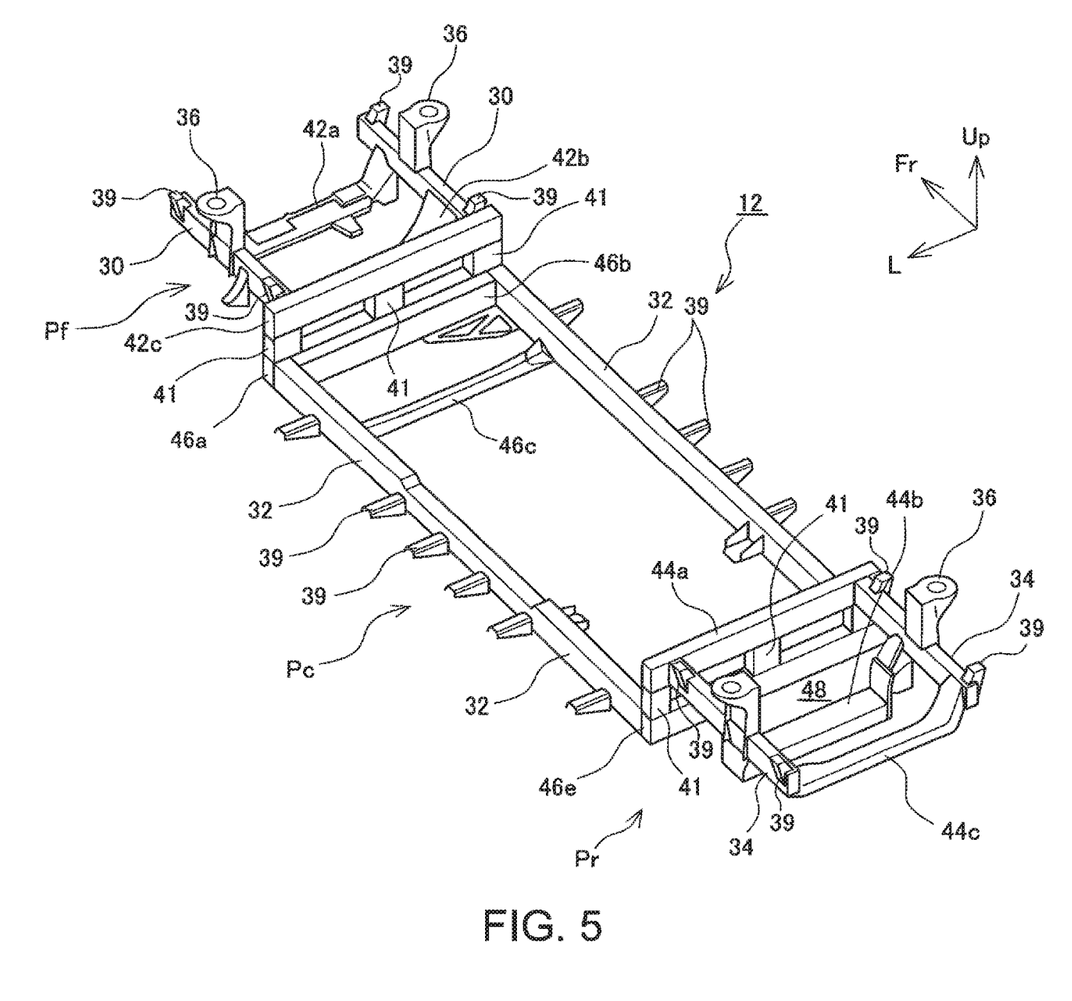
FIG. 5 is a perspective view of the main frame of the vehicle viewed from the rear thereof.

Referring first to FIG. 1 to FIG. 5, the overall configuration of the vehicle 10 will be briefly described. FIG. 1 is a perspective view of the vehicle 10 viewed from outside. FIG. 2 is a perspective view of the vehicle interior viewed from the vehicle center toward the vehicle front, and FIG. 3 is a perspective view of the vehicle interior viewed from the vehicle front toward the vehicle rear. FIGS. 4 and 5 are perspective views of a main frame 12 of the vehicle 10.

The vehicle 10 is used as a bus that travels along a predetermined route within a specific site by automated operation for transporting passengers. However, use of the vehicle 10 according to the disclosure may be modified as appropriate, and may include, for example, use as a movable business space. The vehicle 10 may also be used as a shop, such as a retail store that sells various displayed items or a restaurant that supplies cooked foods and beverages. In another embodiment, the vehicle 10 may be used as an office where deskwork tasks or meeting with customers, for example, are performed. Alternatively, the vehicle 10 may be used as a taxi or a bus that transports passengers or cargo or as a transport vehicle. Further, the vehicle 10 may be used in various manners other than for business, and may be used, for example, as a personal transport. The travelling pattern or travelling speed of the vehicle 10 may be modified as appropriate.

The vehicle 10 is an electric vehicle including, as a motor, a motor for travelling. The vehicle 10 includes, under its floor, a main battery (not shown) for supplying electric power to the travelling motor. As illustrated in FIG. 1, the vehicle 10 does not have a hood or a trunk and has a substantially rectangular parallelepiped outer shape with its front end face and rear end face rising substantially vertically. The vehicle 10 further includes a pair of front wheels 18 near its front end and a pair of rear wheels 20 near its rear end. The vehicle 10 also includes a large window 13 on its side face. The vehicle 10 further includes, in the center on the left side face, slidable double doors 22 that are slidable back and forth for opening and closing.

The vehicle 10 includes, on its front end face, a window 13 functioning as a window shield, and a lamp placing portion 14 disposed under the window 13. The lamp placing portion 14 includes a signal lamp 15 that informs people outside the vehicle of the presence and behavior of the automotive vehicle with light. The vehicle 10 further includes, at the lower end of this lamp placing portion 14, a grille 24 for guiding outside air into the vehicle. The vehicle 10 includes a rear end face having substantially the same configuration as the front end face of the vehicle. Specifically, the rear end face includes a window 13 and a lamp placing portion 14 that are arranged vertically, and a grille 24 at the lower end of the lamp placing portion 14. The vehicle 10 in the present embodiment thus has an outer appearance that is substantially symmetrical in the vehicle length direction.

As illustrated in FIG. 2, the vehicle 10 includes operation panels 26 in the front portion of the vehicle interior for receiving instructions from an operator. A portion of a floor panel 76 near the front end is raised upward to form a seat 28 on which a passenger sits facing towards the rear of the vehicle. Similarly, as illustrated in FIG. 3, a portion of the floor panel 76 near the rear end is also raised upward to form a seat 28 on which a passenger sits facing towards the front of the vehicle. As no large interior equipment such as a seat is fixed around doors 22 in the vehicle interior, a large space is secured.

The vehicle 10 in this embodiment has a body-on-frame structure in which a box-shape body 16 is assembled on a ladder-like main frame 12. As illustrated in FIGS. 4 and 5, the main frame 12 is broadly divided into a front part Pf located between a pair of front wheels 18, a rear part Pr located between a pair of rear wheels 20, and a center part Pc located between the front part Pf and the rear part Pr. The font part Pf includes a pair of front side members 30 extending along the length of the vehicle, and three front cross members 42a, 42b, and 42c coupling the pair of front side members 30. The front cross member 42c couples rear ends of the two front side members 30 together. A suspension tower 36 stands on the top face of each of the front side members 30 for supporting an air suspension (not shown).

The rear part Pr includes, similar to the front part Pf, a pair of rear side members 34 extending along the length of the vehicle, and rear cross members 44a, 44b, and 44c coupling the pair of rear side members 34. The rear cross member 44a couples front ends of the rear side members 34 together. The suspension tower 36 also stands on the top face of each of the rear side member 34 for supporting the air suspension (not shown).

The center part Pc includes a pair of center side members 32 extending along the length of the vehicle, and a plurality of center cross members 46a, 46b, 46c, 46d, and 46e coupling the pair of center side members 32. The center cross member 46a couples the front ends of the pair of center side members 32 together, and the center cross member 46e couples the rear ends of the pair of center side members 32 together. The center cross member 46b is disposed adjacent to and behind the center cross member 46a, and the center cross member 46d is disposed adjacent to and in front of the center cross member 46e. In other words, the center part Pc includes, at each of its front end and its rear end, two center cross members 46 extending along the width of the vehicle that are stacked in the vehicle length direction, to thereby more efficiently prevent distortion of the center part Pc.

As is clear from FIGS. 4 and 5, the center part Pc is located at a level lower than the front part Pf and the rear part Pr. The main frame 12 therefore includes, at a boundary between the center part Pc and the front part Pf, kick members 41 extending vertically to connect the front cross member 42c and the center cross member 46a. Similarly, the main frame 12 includes, at a boundary between the center part Pc and the rear part Pr, kick members 41 extending vertically to connect the center cross member 46e and the rear cross member 44a.

The side members and the cross members other than the center cross member 46c are square pipe members having a rectangular cross section. FIGS. 4 and 5 illustrate all of the side members and the cross members in a simple form; however, as illustrated in a detailed view of part A shown in FIG. 4, each of these members includes through holes 51 (triangular holes in the illustrated example) on their side faces or top or bottom face. The main frame 12 having these through holes 51 has a significantly reduced weight. The through holes 51 further allow some conduits and lines to pass through the interior of the side members or cross members having a rectangular pipe shape via the through holes 51.

A motor, a power transmission device, a travel gear, a suspension system, a steering system, and an electric system, for example, are assembled on the main frame 12 described above to form a chassis. As described above, the front portion (corresponding to the front part Pf) and the rear portion (corresponding to the rear part Pr) of the floor panel 76 are raised upward. The motor and the majority of the various systems described above are disposed in a space under these raised portions of the floor panel 76. In particular, a motor unit 50 including a travelling motor is housed in a space under the rear raised portion of the floor panel 76 (a space between the pair of rear wheels 20, which corresponds to a rear lower corner of the vehicle 10). In the following description, the space under the rear raised portion of the floor panel 76 will be referred to a "power unit chamber 48".

The box-shape body 16 is assembled on this main frame 12. Each of the side members 30, 32, and 34 includes, on their outer side faces, a plurality of protruding cab mounting brackets 39 for mounting and fixing the body 16. As illustrated in FIG. 1, the body 16 includes, for example, pillars 38 extending along the height of the vehicle, and rails 40 extending along the length of the vehicle at a boundary between the side face and the top face of the vehicle 10.

The location of the motor unit 50 will now be described with reference to FIG. 6, which schematically illustrates the power unit chamber 48 viewed laterally. The motor unit 50 is a component including a casing that houses a travelling motor, gears that transmit the output of the travelling motor, and other elements, as a unit. As described above, the motor unit 50 is housed in the power unit chamber 48 located under the floor in the rear part of the vehicle 10.

The power unit chamber 48 includes the pair of rear side members 34 extending along the length of the vehicle, and the three rear cross members 44a, 44b, and 44c extending along the vehicle width to couple the pair of rear side members 34. In the following description, among the three rear cross members 44a, 44b, and 44c, the rear cross member 44 in the middle will be referred to as a "first cross member 44b" and the rear cross member 44 disposed further rearward in the vehicle with respect to the first cross member 44b (that is, further outward in the vehicle length direction) will be referred to as a "second cross member 44c".

Figure 6:
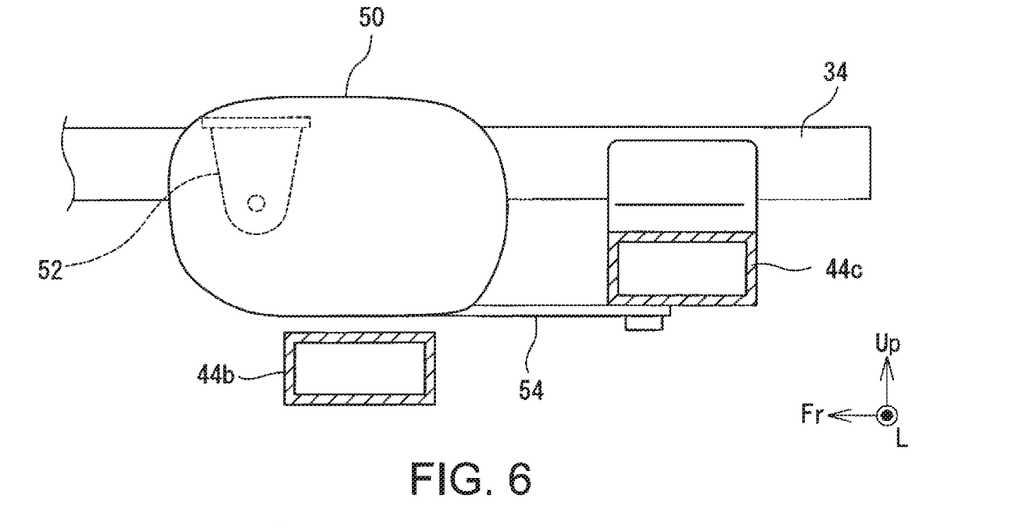
FIG. 6 is a side view schematically illustrating a power unit chamber.

As illustrated in FIG. 6, the motor unit 50 is held by suspension by a motor mount 52 attached to the rear side member 34 above the first cross member 44b. The shape and installation position, for example, of the motor mount 52 may be modified as appropriate.

A torque rod 54 extends from the bottom of the motor unit 50 toward the rear of the vehicle 10. The torque rod 54 is fastened to the bottom face of the second cross member 44c. The torque rod 54 is thus fixed to the second cross member 44c to thereby efficiently prevent oscillation of the motor unit 50 about the vertical axis.

As described above, the motor unit 50 is disposed above the first cross member 44b. In such a configuration, if the first cross member 44b is disposed at a high level, the top face of the motor unit 50 would also be located at a high level, which further causes the floor panel 76 corresponding to the top face of the power unit chamber 48 to be located at a high level. This may narrow the space of the vehicle interior. In the present embodiment, to lower the position of the motor unit 50, the opposite end portions of the first cross member 44b are extended downward from the rear side members 34 so that an intermediate portion of the first cross member 44b is located further downward with respect to the rear side members 34. In other words, in this embodiment, the first cross member 44b above which the motor unit 50 is placed has a substantially U shape opened upward in a front view. This configuration lowers the level at which the motor unit 50 is placed, thereby securing the wide space in the vehicle interior.

Figure 7:
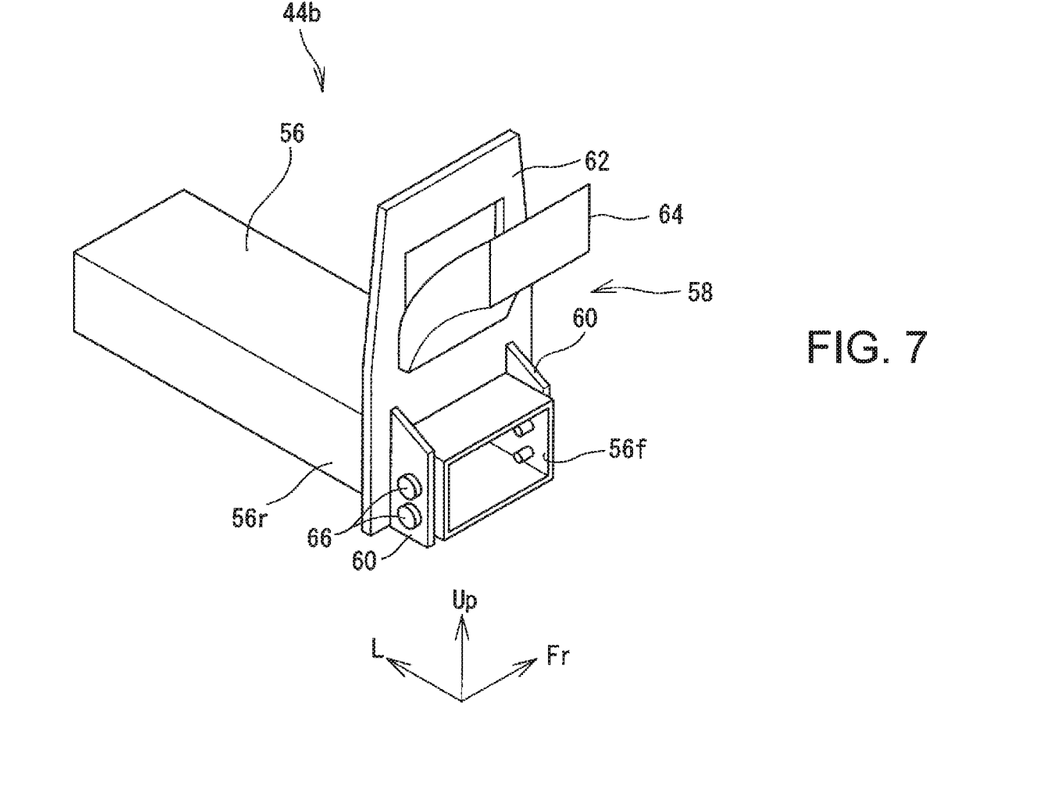
FIG. 7 is a perspective view of a first cross member.
Figure 8:
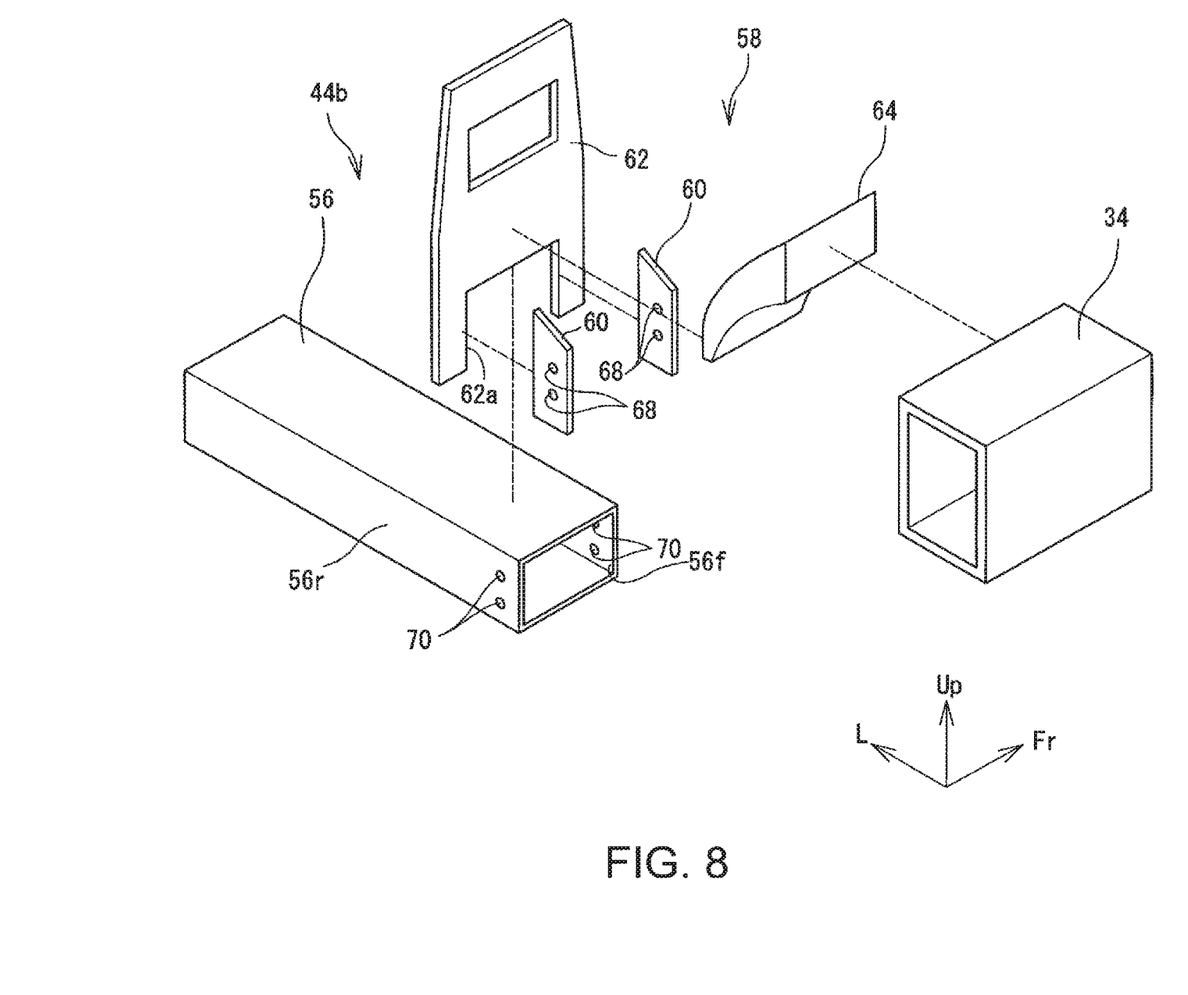
FIG. 8 is an exploded perspective view illustrating the first cross member.

The configuration of the first cross member 44b will be described in further detail. FIG. 7 is a perspective view of the first cross member 44b, while FIG. 8 is an exploded perspective view of the first cross member 44b. The first cross member 44b is broadly divided into an intermediate member 56 and a pair of coupling members 58. The intermediate member 56 is a frame member extending along the width of the vehicle at a location further downward with respect to the rear side member 34. The intermediate member 56 has a rectangular pipe shape having a substantially rectangular cross section, as illustrated in FIGS. 7 and 8. The intermediate member 56 includes a top face having a substantially fixed height, and has a substantially linear shape extending straight along the width of the vehicle when viewed from above. The motor unit 50 is held by suspension using the motor mount 52 above the intermediate member 56. Alternatively, the motor unit 50 may be placed on and fixed to the intermediate member 56, rather than being held by suspension. In this case, the intermediate member 56 need not have a constant dimension in the vehicle length direction, and may locally have a larger dimension in the vehicle length direction only in a portion where the motor unit is placed. In another embodiment, the intermediate member 56 may further include a plate member on which the motor unit 50 is placed near the portion of the intermediate member 56 where the motor unit 50 is placed.

The coupling member 58 is connected to each end of the intermediate member 56 in the vehicle width direction. Each coupling member 58 extends from the rear side member 34 downward or diagonally downward toward the intermediate member 56. The coupling member 58 is completely independent from the intermediate member 56; the intermediate member 56 is connected to the coupling member 58 using a connecting method such as fastening and welding. In this embodiment, to enhance maintainability of the motor unit 50, the intermediate member 56 is fastened to the coupling member 58 using bolts, such that both the intermediate member 56 and the coupling members 58 can be separated without being damaged. The intermediate member 56 may be removably fastened to the coupling member 58 using other fastening members, such as pins and screws, in place of bolts.

The coupling member 58 further includes a root portion 64, a main plate 62, and a pair of coupling plates 60. The root portion 64, the main plate 62, and the coupling plates 60 are joined with each other by welding. The main plate 62 is a planar plate member disposed substantially orthogonally to the longitudinal direction of the intermediate member 56. The main plate 62 includes a substantially rectangular opening 62a at its lower end. The opening 62a has substantially the same outer shape as that of the intermediate member 56, and, in assembling, the intermediate member 56 is inserted into this opening 62a. The root portion 64 includes a first end welded to the main plate 62 and a second end welded to the rear side member 34.

The pair of coupling plates 60 are welded on opposite sides of the opening 62a of the main plate 62 to stand in the direction orthogonal to a surface of the main plate 62. When the intermediate member 56 is inserted into the opening 62a, these coupling plates 60 are superposed with a front wall 56f and a rear wall 56r of the intermediate member 56 in the vehicle length direction. The coupling plate 60 further includes two plate side holes 68 arranged in the vertical direction. Each of the front wall 56f and the rear wall 56r of the intermediate member 56 similarly includes member side holes 70 such that they are aligned with the plate side holes 68. The intermediate member 56 further includes nuts (not shown) that engage with fastening bolts 66 at positions on an inner face of the intermediate member 56 corresponding to the member side holes 70. By screwing the fastening bolt 66, through the plate side hole 68 and the member side hole 70, into the nut with the intermediate member 56 being inserted into the opening 62a, the intermediate member 56 is coupled with the coupling member 58.

As is clear from the above description, the intermediate member 56 is fastened to the coupling member 58 with bolts, such that the intermediate member 56 is detachable from the coupling member 58 which is fixed to the rear side member 34. This configuration enhances maintainability of the motor unit 50. Specifically, when the motor unit 50 must be removed from the motor mount 52 for maintenance, the first cross member 44b traversing the power unit chamber 48 obstructs the removal of the motor unit 50. In this embodiment, someone wishing to remove the motor unit 50 from the vehicle may separate the intermediate member 56 disposed under the motor unit 50 from the coupling member 58 (remove the fastening bolts 66) to thereby remove the intermediate member 56 from the vehicle 10. Then, the motor unit 50 can be decoupled from the motor mount 52 and removed out from under the vehicle. As the intermediate member 56 disposed under the motor unit 50 has been removed, the motor unit may be easily decoupled from the motor mount 52 and removed out from the vehicle, enhancing maintainability of the motor unit 50.

Figure 9:
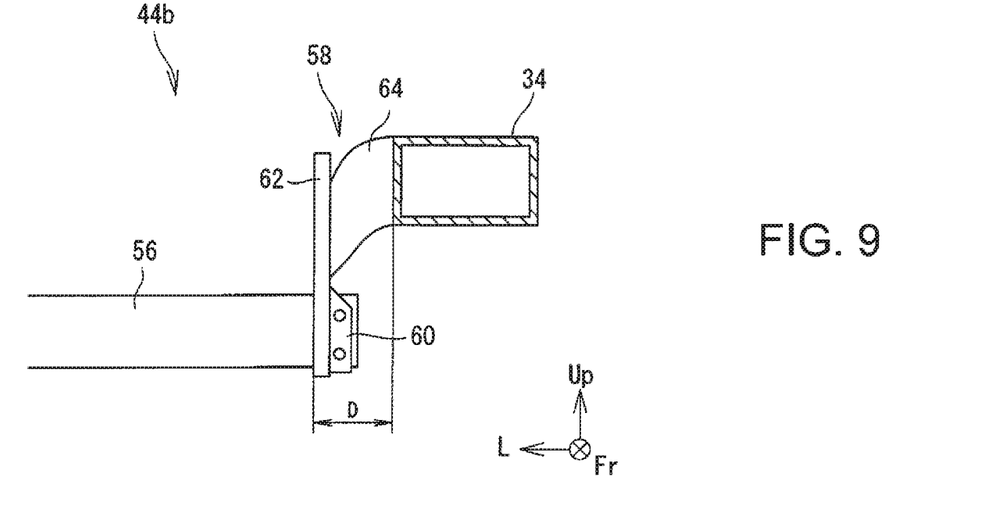
FIG. 9 is a front view illustrating a peripheral portion of an end of the first cross member in the vehicle width direction.

As is further clear from the above description, in this embodiment, the first cross member 44b is composed of the intermediate member 56 extending along the vehicle width and the coupling members 58 that are discrete components of the intermediate member 56. This configuration may contribute to further reducing the dead space in the power unit chamber 48, as will be described with reference to FIG. 9 and FIG. 10. FIG. 9 is a front view illustrating a region around an end of the first cross member 44b in this embodiment in the vehicle width direction, and FIG. 10 is a front view illustrating a region around an end of a cross member 100 in a comparative example in the vehicle width direction.

As described above, in this embodiment, to lower the level at which the motor unit 50 is disposed, the first cross member 44b above which the motor unit 50 is placed is configured in a substantially U shape such that the intermediate portion is located further downward with respect to the opposite end portions. To obtain a similar shape, the cross member 100 may be configured such that its opposite ends in the vehicle width direction are curved upward as they extend outward, as illustrated in FIG. 10. In such a case, an intermediate portion 100a of the cross member 100 and the coupling portions 100b coupling the intermediate portion 100a with the rear side members 34 are formed of a single continuous member. Such a configuration also allows the intermediate portion 100a to be located further downward with respect to the rear side members 34, thereby lowering the level at which the motor unit 50 is disposed.

Figure 10:
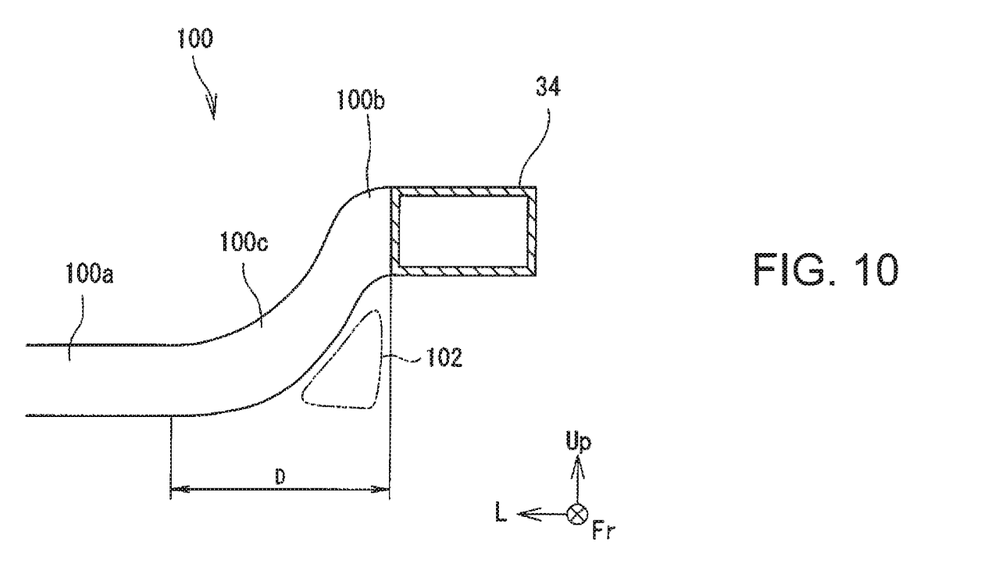
FIG. 10 is a front view illustrating a peripheral portion of an end of a cross member in the vehicle width direction according to a comparative example.

The configuration illustrated in FIG. 10, however, requires a relatively large curved portion 100c in a region where the intermediate portion 100a transitions to the coupling portion 100b, hampering the location of any components above or under this curved portion 100c, and therefore likely creating dead space. More specifically, attempts to install components on the curved portion 100c stably would fail because of the curved mounting surface. Although suspending a component under the curved portion 100c may be attempted, the shape of the space 102 under the curved portion 100c, which is a substantially triangular space as illustrated in FIG. 10, limits the shape of the components which can be disposed without wasting space. As such, when the cross member 100 includes the intermediate portion 100a and the coupling portions 100b that are formed of a single continuous member as illustrated in FIG. 10, a transition region D from the rear side member 34 to the intermediate portion 100a tends to be large, which leads to generation of dead space.

According to the present embodiment, as described in multiple ways above, the intermediate member 56 extending along the vehicle width and the coupling members 58 coupling the intermediate member 56 to the rear side members 34 are discrete components. This configuration eliminates a large curved region in the first cross member 44b, and allows the coupling members 58 and the intermediate member 56 to be connected at a relatively steep angle (90 degrees, for example). This configuration further significantly reduces the transition region D from the rear side member 34 to the intermediate member 56 when compared to the comparative example illustrated in FIG. 10, thereby reducing the dead space in the power unit chamber 48 and increasing the space efficiency of the power unit chamber 48. In other words, the motor unit 50 having the same size may be supported with a smaller cross member in the present embodiment than a cross member in the comparative example illustrated in FIG. 10. Consequently, the technique of the present embodiment enables both a reduction in the size of the power unit chamber 48 and reduction in the size of the vehicle 10.

The second cross member 44c is disposed further rearward (further outward along the length of the vehicle) with respect to the first cross member 44b. The second cross member 44c has opposite end portions that are curved such that the intermediate portion of the second cross member 44c is lower than the opposite end portions (see FIG. 5). However, the level of the intermediate portion of the second cross member 44c is lower than the rear side members 34 but is higher than the intermediate member 56 of the first cross member 44b. Therefore, the intermediate portion of the second cross member 44c faces the motor unit 50 in the vehicle length direction, as illustrated in FIG. 6. This arrangement also reliably protects the motor unit 50 in the event of a rear collision.

More specifically, when an object (another vehicle traveling behind, for example) crashes into the rear part of a vehicle of the present embodiment, the collision load is applied to the second cross member 44c before it is applied to the motor unit 50. At this time, some portion or all of the collision load is transmitted to the second cross member 44c and the rear side members 34 connected to the second cross member 44c in a distributed manner, and is absorbed by these components due to their deformation and bending.

This configuration significantly reduces the collision load input to the motor unit 50 to thereby efficiently prevent damage to the motor unit 50.

Further, in the present embodiment, the bottom face of the second cross member 44c is substantially level with the torque rod 54, and the torque rod 54 is fastened to the bottom face of the second cross member 44c. The torque rod 54 fastened to the second cross member 44c reduces oscillation of the motor unit 50 about the vertical axis, as described above. Typically, to remove the motor unit 50 out of the vehicle 10, the motor unit 50 is accessed from under the vehicle 10. The configuration in which the torque rod 54 extending from the motor unit 50 is fastened to the bottom face of the second cross member 44c allows the torque rod 54 and the motor unit 50 to be easily removed out from under the vehicle 10, which further results in an increase in the maintainability of the motor unit 50.

The configuration described above is only an example, and any modified vehicle frame structures may be employed that include the first cross member including the intermediate member 56 extending along the width of the vehicle at a location further downward with respect to the side members and the pair of coupling member 58 extending downward or diagonally downward from the side members toward the ends of the intermediate member 56 in the vehicle width direction. For example, while in the present embodiment, the coupling member 58 is composed of a plurality of components (the main plate 62, the coupling plates 60, and the root portion 64) that are welded with each other, the coupling member 58 may be a single component or may be composed of a combination of a larger number of components. Further, any modified intermediate members 56 located under the motor unit 50 may be employed. For example, the intermediate member 56 may be composed of a combination of a plurality of components that are separated in the height, length, or width direction. Also, the intermediate member 56 and the coupling members 58, which are discrete components, need not be removable from each other. In other words, the intermediate member 56 and the coupling members 58 may be connected in an inseparable manner, and may be joined together by welding.

While in the above description, the power unit chamber 48 is disposed in a lower rearward part of the vehicle 10, the power unit chamber 48 may be disposed elsewhere under the vehicle 10, such as in a lower frontward part of the vehicle 10, for example. When the power unit chamber 48 is disposed in a lower frontward part of the vehicle 10, the second cross member facing the motor unit 50 along the length of the vehicle may be disposed forward of the first cross member located under the motor unit 50. Further, while in the present embodiment, a vehicle having a substantially box shape driven with low-speed automated operation has been described as an example, the vehicle frame structure disclosed in the present embodiment may be mounted in other types of vehicle.

REFERENCE SIGNS LIST 10 vehicle, 12 main frame, 13 window, 14 lamp placing portion, 15 signal lamp, 16 body, 18 front wheels, 20 rear wheels, 22 door, 24 grille, 26 operation panel, 28 seat, 30 front side member, 32 center side member, 34 rear side member, 36 suspension tower, 38 pillar, 40 rail, 41 kick member, 42a, 42b, 42c front cross member, 44a rear cross member, 44b first cross member, 44c second cross member, 46a, 46b, 46c, 46d, 46e center cross member, 48 power unit chamber, 50 motor unit, 51 through hole, 52 motor mount, 54 torque rod, 56 intermediate member, 58 coupling member, 60 coupling plate, 62 main plate, 62a opening, 64 root portion, 66 fastening bolt, 68 plate side hole, 70 member side hole, 76 floor panel, 100 cross member, 100a intermediate portion, 100b coupling portion, 100c curved portion, D transition region, Pc center part, Pf front part, Pr rear part.

The invention claimed is:

1. A vehicle frame structure comprising:
   a pair of side members extending along a length of a vehicle in a lower part of the vehicle; and
   a first cross member coupling the pair of side members, wherein
   the first cross member comprises:
      an intermediate member extending along a width of the vehicle at a location further downward with respect to the side members, the intermediate member being located under a motor unit; and
      a pair of coupling members respectively connected to opposite ends of the intermediate member along the width of the vehicle, the coupling members respectively extending downward or diagonally downward from the respective side members toward the opposite ends of the intermediate member.

2. The vehicle frame structure according to claim 1, wherein
   the coupling members are respectively removably fastened to the opposite ends of the intermediate member by fastening members.

3. The vehicle frame structure according to claim 1, further comprising:
   a second cross member coupling the pair of side members at a location further outward along the length of the vehicle with respect to the first cross member, wherein
   the second cross member includes an intermediate portion along the width of the vehicle, the intermediate portion facing the motor unit along the length of the vehicle.

4. The vehicle frame structure according to claim 3, further comprising:
   a torque rod extending from a lower part of the motor unit outward along the length of the vehicle, the torque rod being fastened to a bottom face of the second cross member.

5. The vehicle frame structure according to claim 1, wherein
   the intermediate member has a linear shape extending straight along the width of the vehicle.

6. A vehicle frame structure comprising:
   a pair of side members extending along a length of a vehicle in a lower part of the vehicle; and
   a first cross member coupling the pair of side members, wherein
   the first cross member comprises:
   an intermediate member extending along a width of the vehicle at a location further downward with respect to the side members, the intermediate member being located under a motor unit; and
   a pair of coupling members respectively connected to opposite ends of the intermediate member along the width of the vehicle, coupling the intermediate member to the pair of side members, the coupling members respectively extending downward or diagonally downward from the respective side members between the opposite ends of the intermediate member and the pair of side members.

7. The vehicle frame structure according to claim 6, wherein the coupling members are respectively removably fastened to the opposite ends of the intermediate member by fastening members.

8. The vehicle frame structure according to claim 6, further comprising:
a second cross member coupling the pair of side members at a location further outward along the length of the vehicle with respect to the first cross member, wherein
the second cross member includes an intermediate portion along the width of the vehicle, the intermediate portion facing the motor unit along the length of the vehicle.

9. The vehicle frame structure according to claim 8, further comprising:
a torque rod extending from a lower part of the motor unit outward along the length of the vehicle, the torque rod being fastened to a bottom face of the second cross member.

10. The vehicle frame structure according to claim 6, wherein
the intermediate member has a linear shape extending straight along the width of the vehicle.

\* \* \* \* \*